US011242945B2

(12) United States Patent
Libohova

(10) Patent No.: US 11,242,945 B2
(45) Date of Patent: Feb. 8, 2022

(54) HANGER FOR MESSENGER WIRE

(71) Applicant: Autronic Plastics, Inc., Central Islip, NY (US)

(72) Inventor: Agjah I. Libohova, East Setauket, NY (US)

(73) Assignee: Autronic Plastics, Inc., Central Islip, NY (US)

( * ) Notice: Subject to any disclaimer, the term of this patent is extended or adjusted under 35 U.S.C. 154(b) by 86 days.

(21) Appl. No.: 16/580,673

(22) Filed: Sep. 24, 2019

(65) Prior Publication Data

US 2021/0088158 A1 Mar. 25, 2021

(51) Int. Cl.
*F16L 3/00* (2006.01)
*F16L 3/14* (2006.01)
*G02B 6/36* (2006.01)
*F16L 3/137* (2006.01)

(52) U.S. Cl.
CPC .............. *F16L 3/14* (2013.01); *F16L 3/137* (2013.01); *G02B 6/3616* (2013.01)

(58) Field of Classification Search
None
See application file for complete search history.

(56) References Cited

U.S. PATENT DOCUMENTS

| | | | |
|---|---|---|---|
| 810,004 A * | 1/1906 | Tabler | F16L 3/13 248/61 |
| 2,417,244 A * | 3/1947 | Eggert | H02G 7/10 248/61 |
| 4,658,100 A | 4/1987 | Suris | |
| 5,015,205 A | 5/1991 | Franks, Jr. | |
| 5,421,068 A | 6/1995 | Menechella | |
| 5,957,416 A * | 9/1999 | Sellati | H02G 3/26 248/61 |
| 7,891,614 B2 | 2/2011 | Czajor | |
| 8,757,562 B2 * | 6/2014 | Fujiwara | F16B 2/24 248/74.2 |

(Continued)

FOREIGN PATENT DOCUMENTS

CA 2190036 A1 5/1998

OTHER PUBLICATIONS

ABB online product catalog, www.tnb.com, accessed Apr. 26, 2019, US Data Sheet, Ty-RAP®, Messenger and Lashing Ties and Straps, admitted prior art.

(Continued)

*Primary Examiner* — Steven M Marsh
(74) *Attorney, Agent, or Firm* — Zollinger & Burleson, Ltd.

(57) ABSTRACT

A messenger wire hanger includes a body having integral first, middle, and hook portions. The hook portion is in the shape of a hook adapted to hook over a messenger wire. The body defines a first opening between the first portion and the middle portion and a second opening between the middle portion and the hook portion. A lashing strap has a first portion and a second portion with the first portion of the lashing strap being disposed in the first opening of the body and the second portion of the lashing strap being disposed in the second opening of the body. Another configuration uses three openings with a second pawl extending between the second and third openings to define a tortuous path for the lashing strap.

24 Claims, 12 Drawing Sheets

(56) References Cited

U.S. PATENT DOCUMENTS

| | | | | |
|---|---|---|---|---|
| 9,706,859 B2* | 7/2017 | Brinton, Jr. | ............ | A47B 97/00 |
| 2008/0229550 A1* | 9/2008 | Elsner | .................... | F16L 3/233 |
| | | | | 24/16 PB |
| 2008/0244874 A1* | 10/2008 | Chiorboli | ................ | F16L 3/137 |
| | | | | 24/16 PB |
| 2013/0067695 A1* | 3/2013 | Giotto | ................ | B65D 63/1072 |
| | | | | 24/16 PB |
| 2019/0072213 A1* | 3/2019 | Kerlin | .................... | F16L 3/133 |

OTHER PUBLICATIONS

ABB online product catalog, www.tnb.com, accessed Apr. 26, 2019, Catalog Page for Catalog No. TYM5423X-S, admitted prior art.

* cited by examiner

HANGER FOR MESSENGER WIRE

BACKGROUND OF THE DISCLOSURE

1. Technical Field

The disclosure generally relates to hardware used to support items and, more particularly, to hangers used with messenger wires. Specifically, the disclosure relates to a hanger for use with a messenger wire wherein the hanger has a body that includes a hook for the messenger wire and a holder structure that adjustably secures a flexible strap to the body.

2. Background Information

Messenger wires are galvanized steel support wires from which cables such as fiber optic cables are supported between raised support structures. The supported cable or cables are hung from the messenger wire by a plurality of messenger wire hangers. One type of these hangers include a metal hook that fits over the messenger wire and a polymer lashing strap that is wrapped around the cable or cables to be supported. Both of these are secured to a mounting head. The hook is either press fit into a slot defined by the mounting head or is held in a slot with one or more locking barbs. The lashing strap includes a series of ratchet teeth that allow the length of the strap to be adjusted in one direction with respect to the mounting head. The mounting head includes a locking pawl that engages the teeth to lock the position of the strap in one direction with respect to the mounting head.

SUMMARY OF THE DISCLOSURE

The disclosure provides a messenger wire hanger that includes a body and a lashing strap. The body can be hooked onto a messenger wire and the lashing strap is wrapped around an item to be supported.

In one configuration, the disclosure provides an integral body having a hook portion integrally formed with the portions of the body that secure the lashing strap to the body.

The disclosure also provides a configuration wherein the lashing strap is disposed through multiple openings defined by the body to secure the lashing strap with respect to the body.

The disclosure further provides a configuration with integral pawls having locking surfaces that engage the lashing strap.

The disclosure further provides a configuration that includes a cradle that receives a portion of the lashing strap wrapped around a dowel to secure the lashing strap.

The disclosure further provides a configuration with a spring steel pawl that engages the lashing strap.

The disclosure further provides a body configuration that can be extruded and cut to width.

The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 6:
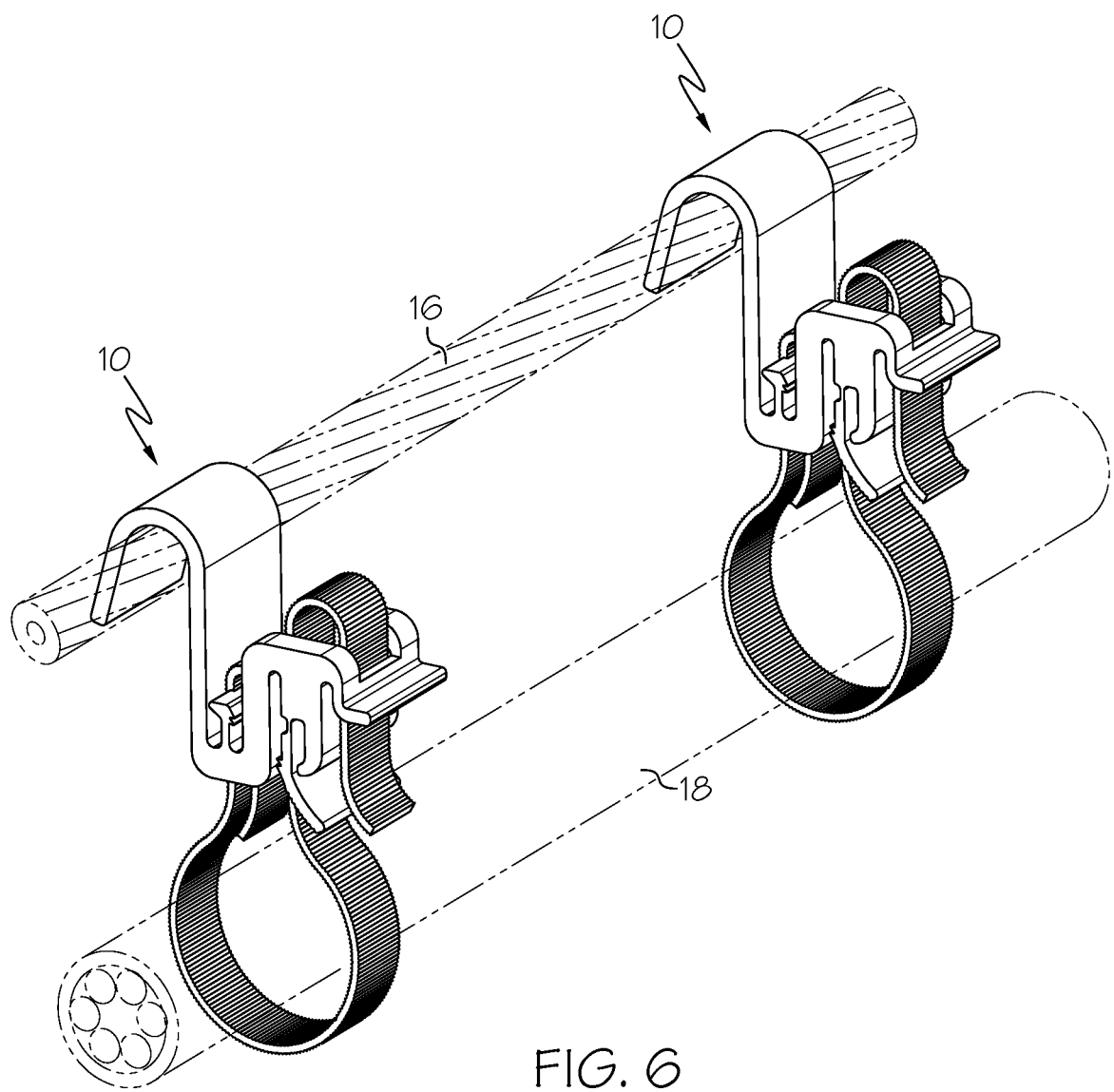
FIG. 6 is a perspective view of a two spaced messenger wire hangers from FIGS. 1-5 supporting a cable bundle from a messenger wire.
Figure 7:
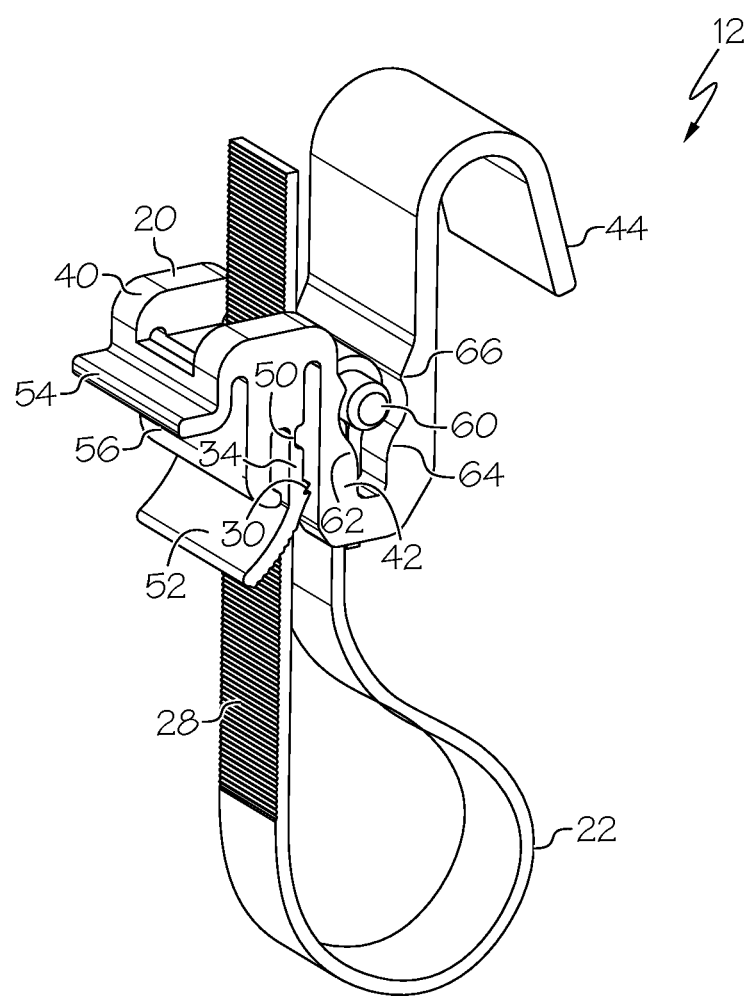
FIG. 7 is a perspective view of a second exemplary configuration of a messenger wire hanger.
Figure 8:
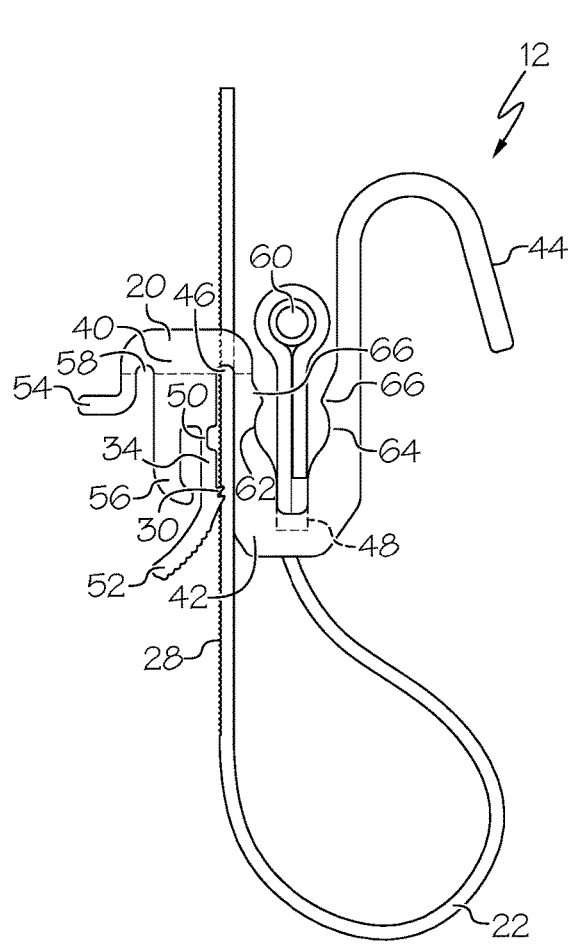
FIG. 8 is a side elevation view of the messenger wire hanger of FIG. 7 with the lashing strap being wrapped around a locking dowel prior to be locked into the locking cradle of the body.
Figure 9:
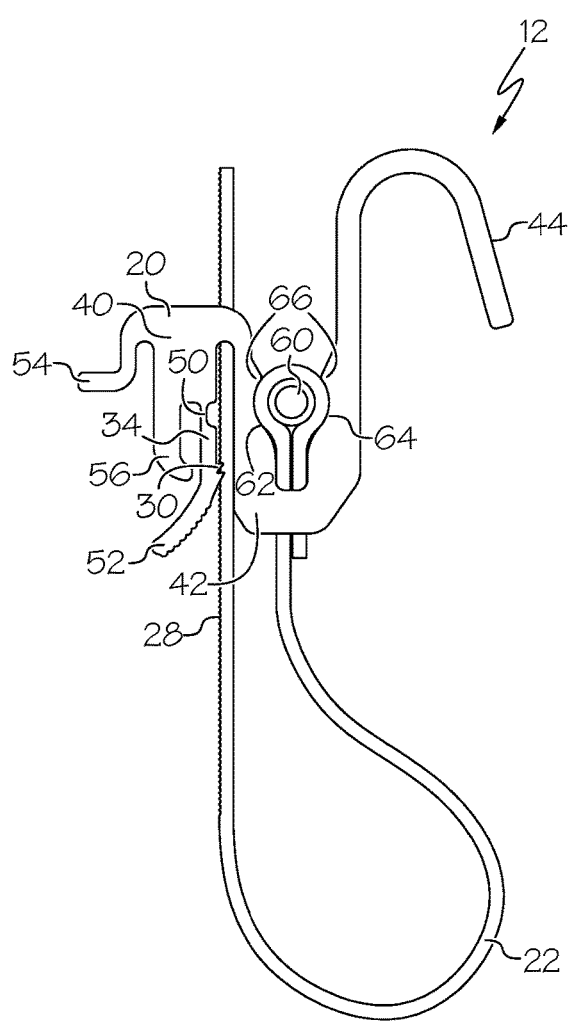
FIG. 9 is a side elevation similar to FIG. 8 showing the rear end of the lashing strap locked with respect to the body.
Figure 10:
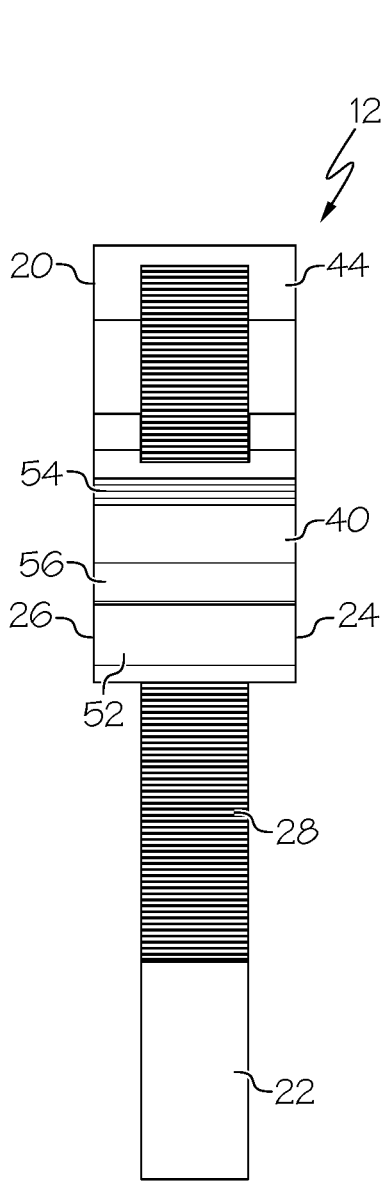
FIG. 10 is a front elevation view of FIG. 7.
Figure 11:
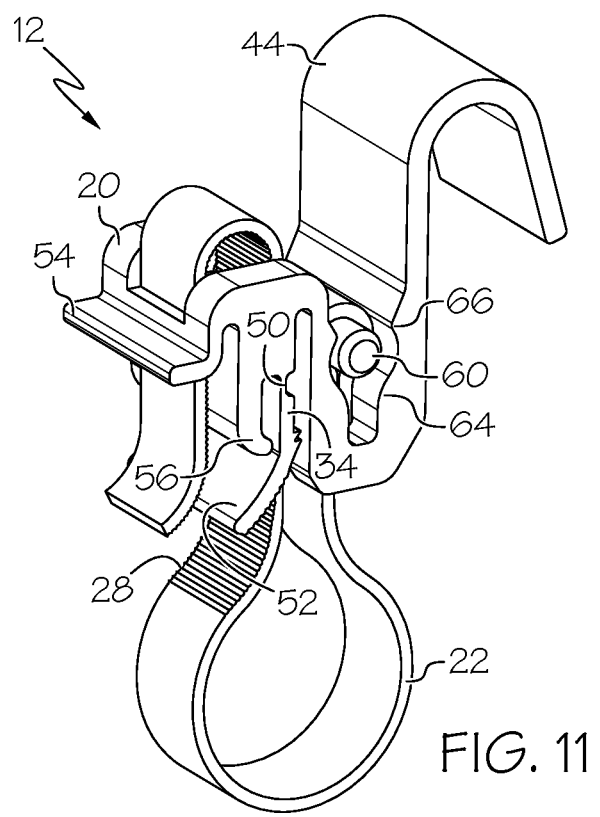
FIG. 11 is perspective view of the second exemplary configuration of the messenger wire hanger in a different configuration.
Figure 12:
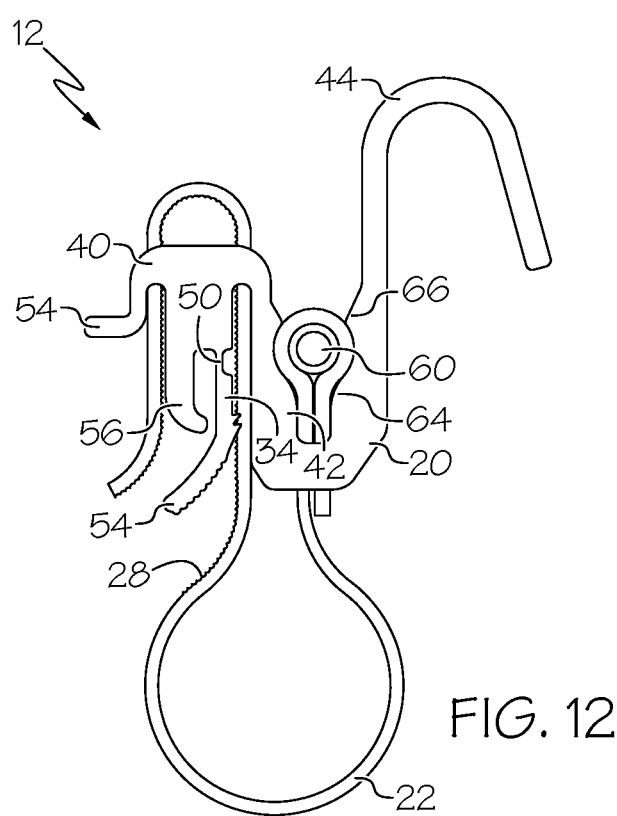
FIG. 12 is a side elevation view of FIG. 11.
Figure 13:
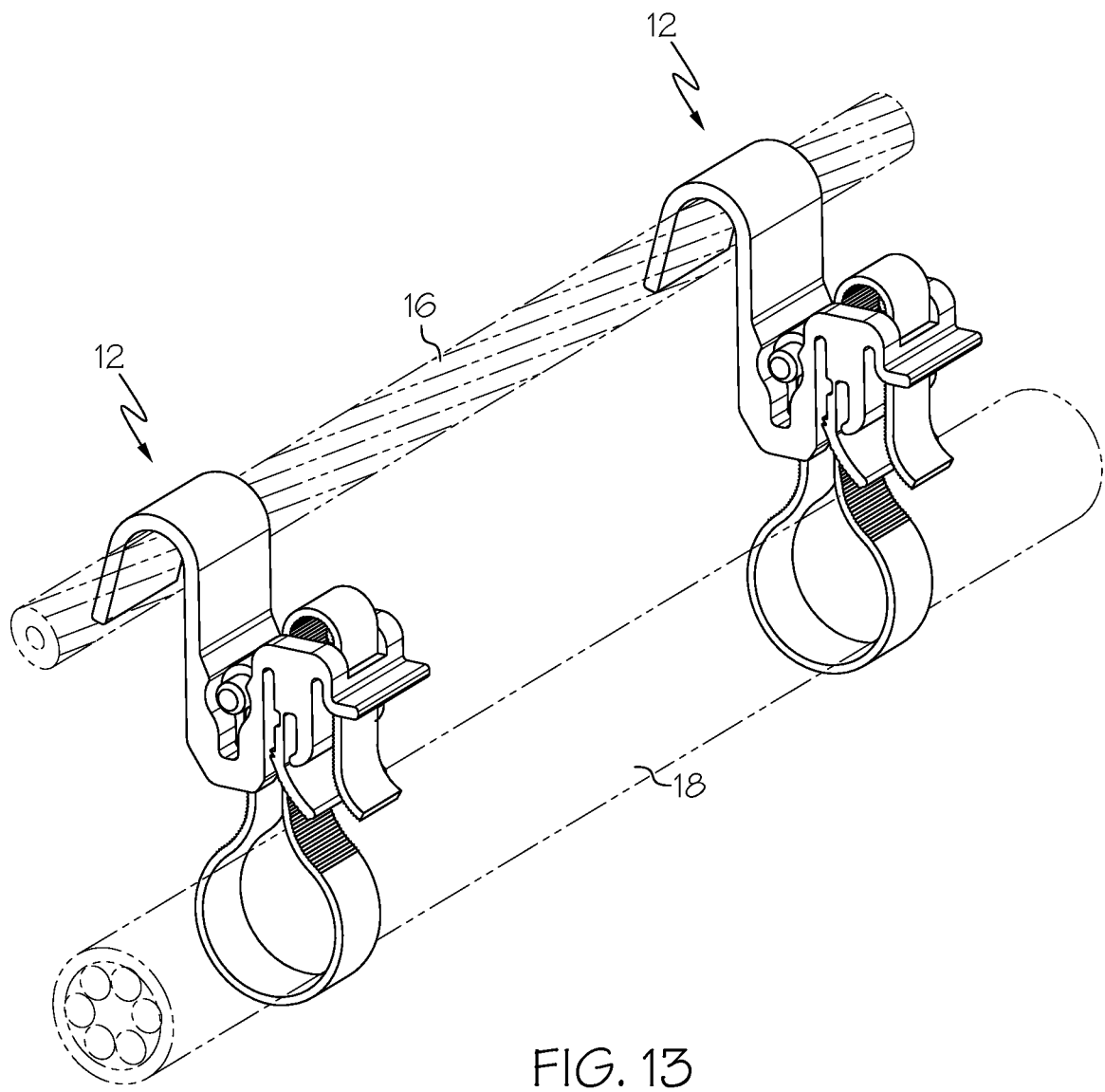
FIG. 13 is a perspective view of a two spaced messenger wire hangers from FIGS. 7-12 supporting a cable bundle from a messenger wire.
Figure 14:
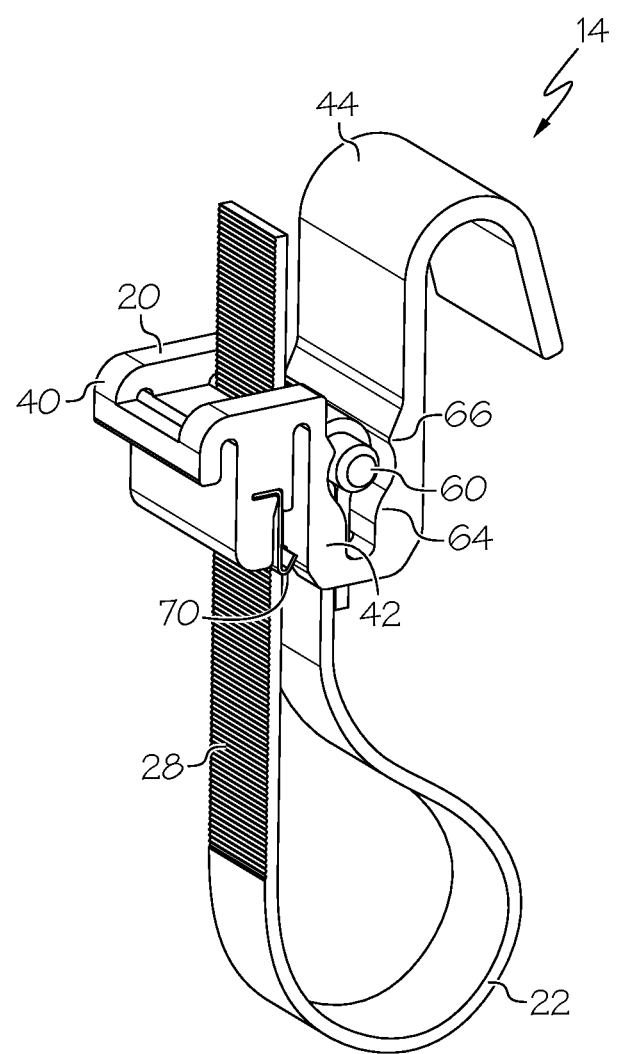
FIG. 14 is a perspective view of a third exemplary configuration of a messenger wire hanger.
Figure 15:
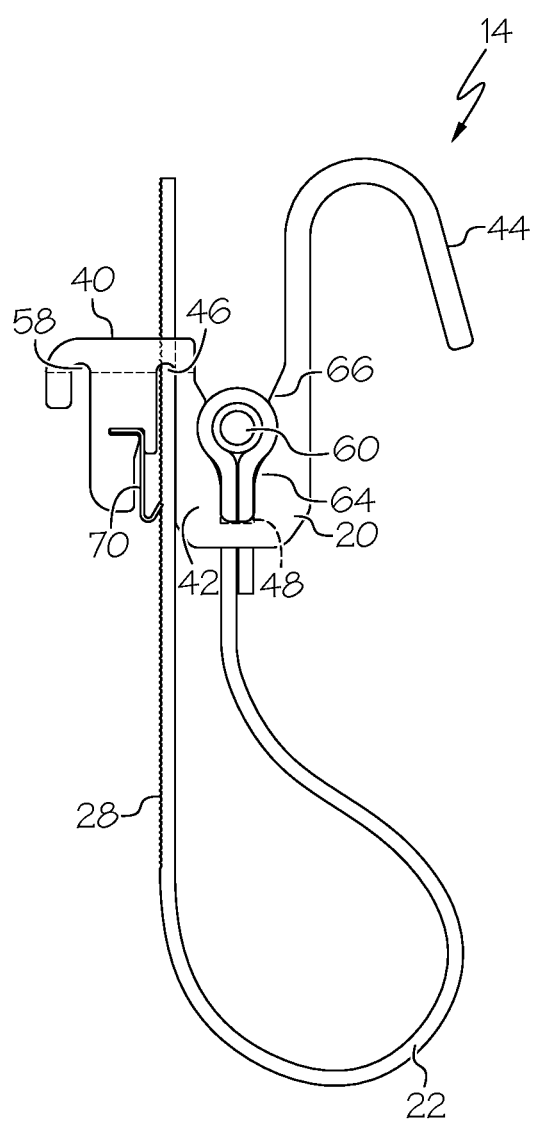
FIG. 15 is a side elevation view of FIG. 14.
Figure 16:
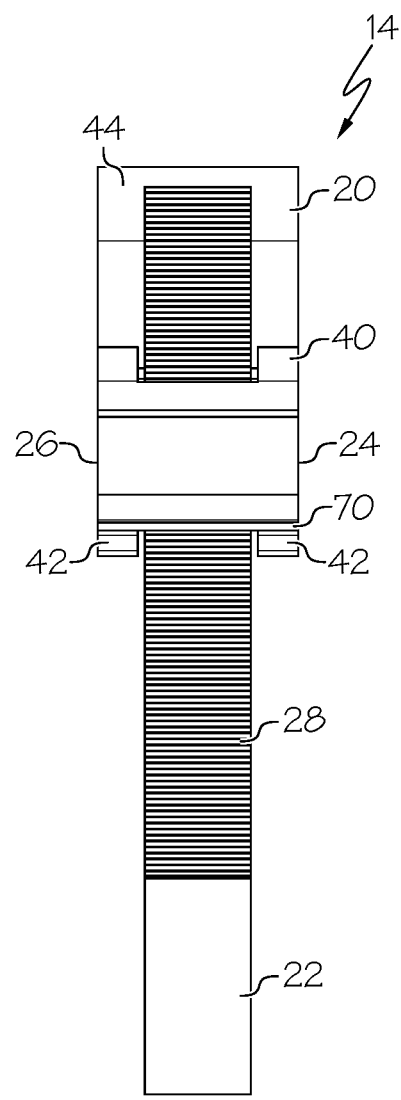
FIG. 16 is a front elevation view of FIG. 14.
Figure 17:
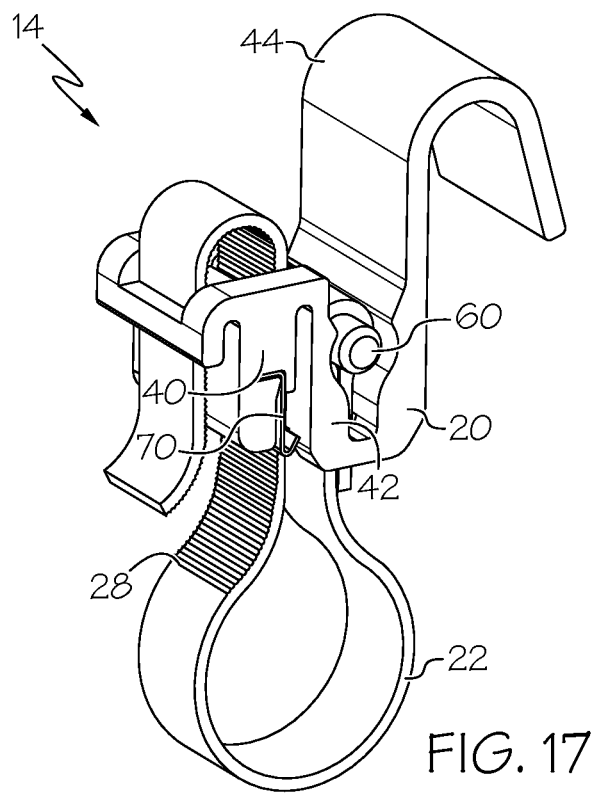
FIG. 17 is perspective view of the third exemplary configuration of the messenger wire hanger in a different configuration.
Figure 18:
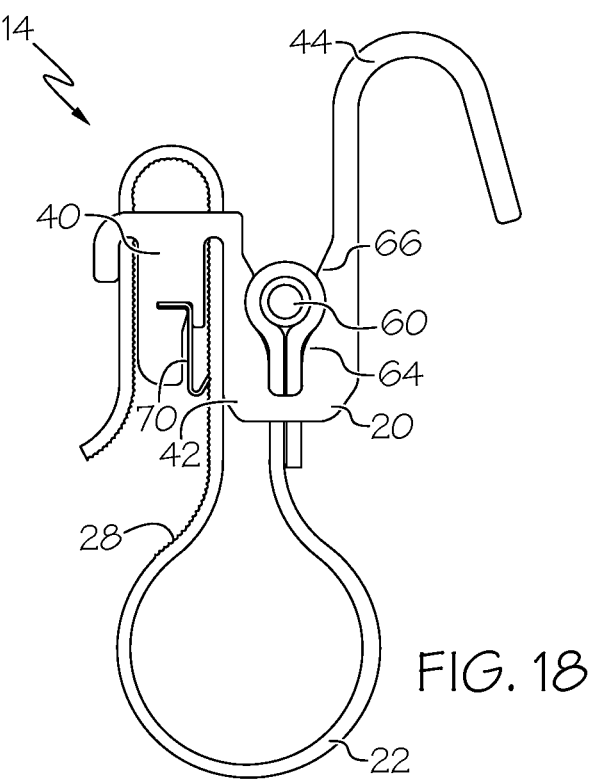
FIG. 18 is a side elevation view of FIG. 17.
Figure 19:
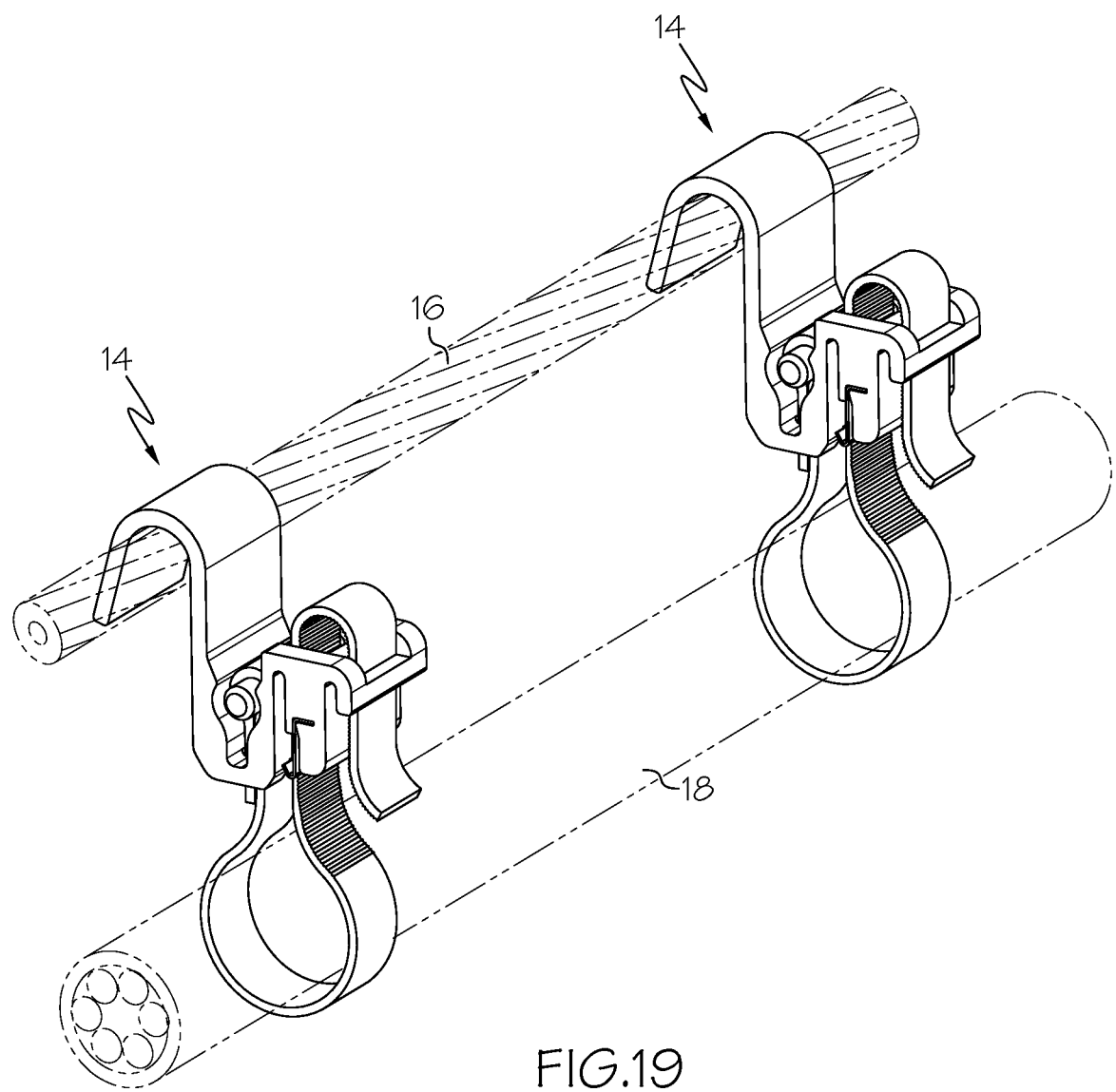
FIG. 19 is a perspective view of a two spaced messenger wire hangers from FIGS. 14-18 supporting a cable bundle from a messenger wire.

A first exemplary configuration of a messenger wire hanger is indicated generally by the reference numeral 10 in FIGS. 1-6. A second exemplary configuration of a messenger wire hanger is indicated generally by the reference numeral 12 in FIGS. 7-13. A third exemplary configuration of a messenger wire hanger is indicated generally by the reference numeral 14 in FIGS. 14-19. The different configurations share features and functions. For example, each configuration of the messenger wire hanger can be hooked onto a messenger wire 16 to support a cable 18 or a bundle of cables 18 from messenger wire 16 as shown in FIGS. 6, 13, and 19.

Messenger wire hanger 10 generally includes a body 20 and a lashing strap 22 which is adjustably positionable with respect to the body 20. Body 20 is configured to be hooked to messenger wire 16 while lashing strap 22 is configured to be wrapped around cable 18 and locked in place with respect to body 20 or cinched tight around cable 18. In the exemplary configurations, body 20 is fabricated from a metal such as aluminum and lashing strap 22 is fabricated from a polymer. Body 20 is configured to be made by extrusion, cut to width, and then finished by forming openings and recesses that receive portions of strap 22. Body 20 is thus an integral piece that does not have to be assembled. Extruding body 20 and cutting it to width provides its elements with the same widths which also leaves the sides of its elements exposed. Body 20 also can be made from other materials such as polymers, ceramics, printable materials, and other metals and can be injection molded, printed, cut from a solid block, or made from other manufacturing processes. Body 20 has first 24 and second 26 sides that define the width of body 20.

Lashing strap 22 includes at least first and second sections of spaced ratchet teeth 28. Teeth 28 are configured to be engaged by locking fingers 30 and 32 of first 34 and second 36 pawls to lock the position of strap 22 with respect to body 20 in one direction. The entire length of strap 22 can be toothed and both sides of strap 22 can be toothed. Lashing strap 22 can be entirely removed from body 20. Lashing strap 22 has a width that is less than the width of body 20.

Body 20 includes integral first 40, middle 42, and hook 44 portions. Hook portion 44 has a substantially U-shaped central portion that allows it to fit over a section of messenger wire 16. Hook portion 44 extends to a position higher than the other portions of body 20 with the end of hook portion 44 being disposed about level with the upper elements of first portion 40. Body 20 defines a first opening 46 between first portion 40 and middle portion 42 and defines a second opening 48 and a third opening 49 between middle portion 42 and hook portion 44.

First portion 40 of body 20 includes integral first pawl 34 that is cantilevered below first opening 46 to position its locking finger 30 in the path of strap 22 so that locking finger 30 engages teeth 28. Locking finger 30 provides a locking surface facing upwardly and an angled ratchet surface facing downwardly to allow strap 22 to be moved upwardly through first opening 46 to tighten the loop formed by strap 22 below body 20.

First pawl 34 is connected to first portion 40 of body 20 with a leg having an area of reduced thickness 50 that allows first pawl 34 to be resiliently bent away from strap 22 to release locking finger 30 from teeth 28 to allow strap 22 to be pulled back down and out of body 20. Area of reduced thickness 50 reduces the thickness of the leg of first pawl 34 by forty to ninety percent to allow it to be flexed without breaking. First pawl 34 and area of reduced thickness 50 have the same width as body 20. To assist the user in moving first pawl 34, an arm 52 projects down from the location of locking finger 30 to a location under first portion 40 accessible to a user's finger. Arm 52 is curved away from middle portion 42 to allow the user to pull upwardly with a finger while holding body 20 with the user's thumb on a tab 54 that projects outwardly from first portion 40 of body 20. The downwardly facing surface of arms 52 is textured to provide grip. First portion 40 of body 20 also includes a stop 56 that projects down in a spaced location from first pawl 34. The lower end of stop 56 is curved inwardly toward first pawl 34 to limit the pivoting movement of first pawl 34. The spacing allows locking finger 30 to be disengaged from teeth 28 but limits the bending of first pawl 34 within its resilient range of bending because first pawl 34 contacts stop 56 before bending beyond its elastic range.

Figure 1:
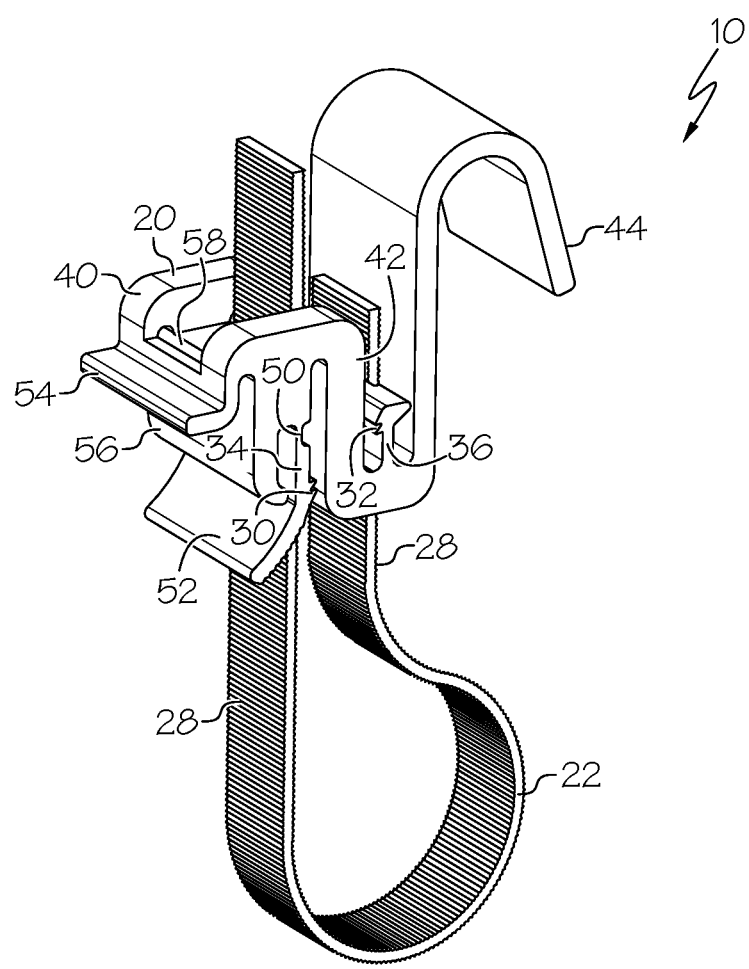
FIG. 1 is a perspective view of a first exemplary configuration of a messenger wire hanger with the flexible strap in an initial condition.
Figure 2:
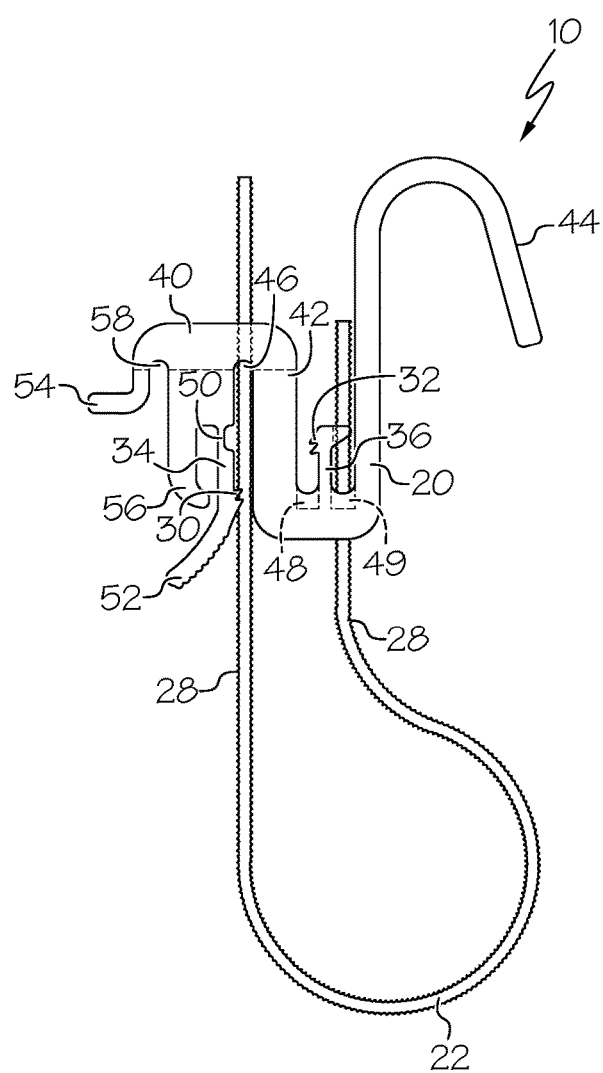
FIG. 2 is a side elevation view of FIG. 1.
Figure 3:
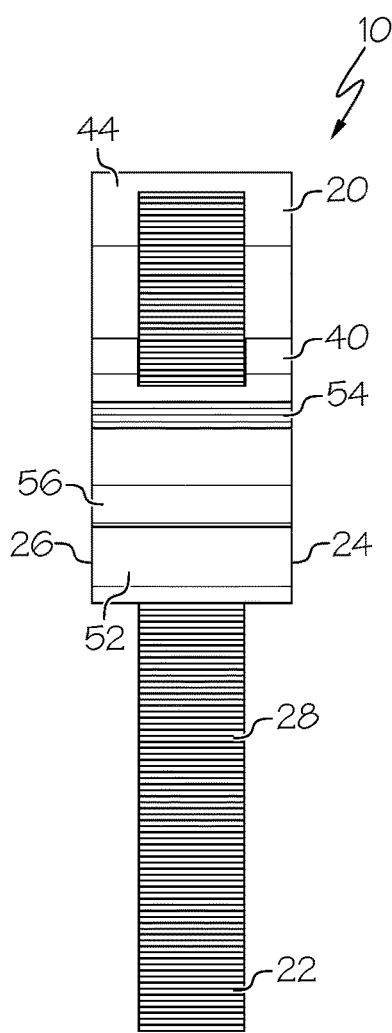
FIG. 3 is a front elevation view of FIG. 1.
Figures 4, 5:
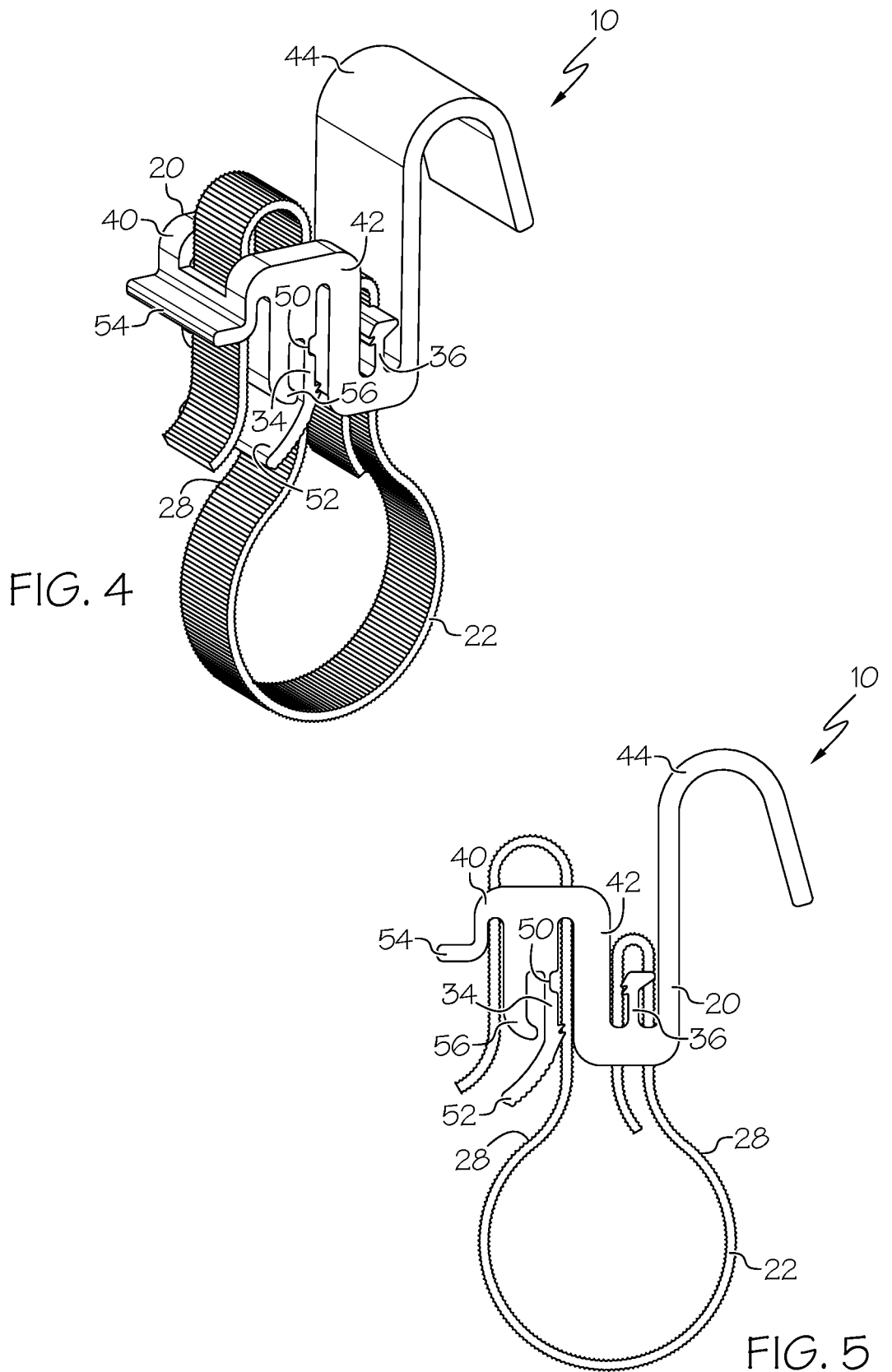
FIG. 4 is perspective view of the first exemplary configuration of the messenger wire hanger with the flexible strap in a different configuration.
FIG. 5 is a side elevation view of FIG. 4.

First portion 40 of body 20 also defines a fourth opening 58 that allows strap 22 to be pushed down through first portion 40 as shown in FIGS. 4-6. This help manage any extra strap length.

Second pawl 36 is disposed between middle portion 42 and hook portion 44 of body 20 and extends from between second opening 48 and third opening 49 with its locking finger 32 disposed over second opening 48. In this configuration, locking finger 32 provides a locking surface facing downwardly and an angled ratchet surface facing upwardly to allow strap 22 to be moved downwardly through second opening 48 after it has been passed up through third opening 49, over the top of second pawl 36, and then down across locking finger 32 and then through second opening 48. This tortuous path for lashing strap 22 makes it harder for it to be separated from body 20. Second pawl 36 has a width that is the same as the width of body 20 and defines an indentation that receives strap 22.

In the first exemplary configuration, first portion 40 of body 20 defines a recessed channel between first opening 46 and fourth opening 58 that allows a portion of strap 22 to be received between two spaced shoulders defined by first portion 40 of body 20. In the same manner, middle 42 and hook 44 portions define a recessed channel between second 48 and third 49 openings between opposite shoulders.

Messenger wire hanger 12 includes some of the same elements as the first exemplary configuration and the same reference numerals are used to identify those elements in FIGS. 7-13. The second exemplary configuration 12 uses a different locking configuration for the portion of strap 22 disposed between middle portion 42 and hanger portion 44 of body 20. In this configuration, strap 22 is looped around a dowel 60 and the combination is wedged between middle portion 42 and hanger portion 44 to wedge strap 22 in a locked condition. When strap 22 is pulled down away from body 20, the looped portion of strap 22 and dowel 60 are pulled tighter against body 20 to increase the locking force.

Body 20 provides a cradle that receives the wrapped dowel 60. The cradle is defined by at least two converging wall portions 62 and 64 defined by portions of middle portion 42 and hanger portion 44 of body 20. Wall portions 62 and 64 converge toward each other and second opening 48. In the exemplary configuration, the upper sections of wall portions 62 and 64 are curved to match the curvature of the wrapped dowel. A detent wall 66 is defined above the curved sections to provide a holding force from above the wrapped dowel. Detents 66 are closer together than the combined outer diameter of the wrapped dowel and enough force to spread detents 66 apart or deform strap 22 is required to snap the wrapped dowel into the locked position between wall portions 62 and 64. In another configuration, strap 22 can be looped and inserted through second opening 48 with its loop positioned between converging wall portions 62 and 54. Dowel 60 can then be inserted from the side to form the locked configuration of strap 22.

Messenger wire hanger 14 includes some of the same elements as the first and second exemplary configurations and the same reference numerals are used to identify those elements in FIGS. 14-19. The third exemplary configuration 14 uses a spring steel locking pawl 70 that is carried by first portion 40 of body 20. The lower end of pawl 70 is hooked upwardly to engage teeth 28 and push strap 22 against middle portion 42 of body 20. First portion 40 of body 20 defines a slot into which the upper portion of pawl 70 is press fit or secured with a locking barb or a fastener.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the above description and attached illustrations are an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A messenger wire hanger comprising:
a body having integral first, middle, and hook portions; the hook portion being in the shape of a hook adapted to hook over a messenger wire;
the body defining a first opening between the first portion and the middle portion;
the body defining a second opening between the middle portion and the hook portion;
a lashing strap having a first portion and a second portion; the first portion of the lashing strap being disposed in the first opening of the body; the second portion of the lashing strap being disposed in the second opening of the body;
the body further including a first pawl that is integral to the body; the first pawl having a locking finger engaged with the first portion of the lashing strap;
the first pawl including a leg that connects the first pawl to the first portion of the body; the leg having an area of reduced thickness that allows the first pawl to flex with respect to the body; and
the body having a first side and a second side with a width defined between the first and second sides of the body; the first pawl extending from the first side of the body to the second side of the body to have a width that is the same as the width of the body.

2. The messenger wire hanger of claim 1, wherein the body has a first side and a second side with a width defined between the first and second sides of the body; the first, middle, and hook portions of the body having the same width.

3. The messenger wire hanger of claim 2, wherein the body is aluminum.

4. The messenger wire hanger of claim 1, wherein the area of reduced thickness extends from the first side of the body to the second side of the body.

5. The messenger wire hanger of claim 4, wherein the area of reduced thickness is disposed between the locking finger of the first pawl and the first portion of the body.

6. The messenger wire hanger of claim 1, wherein the first pawl includes an arm projecting away from the locking finger of the first pawl.

7. A messenger wire hanger comprising:
a body having integral first, middle, and hook portions; the hook portion being in the shape of a hook adapted to hook over a messenger wire;
the body defining a first opening between the first portion and the middle portion;
the body defining a second opening between the middle portion and the hook portion;
a lashing strap having a first portion and a second portion; the first portion of the lashing strap being disposed in the first opening of the body; the second portion of the lashing strap being disposed in the second opening of the body;
the body including a first pawl that is integral to the body; the first pawl having a locking finger engaged with the first portion of the lashing strap;
the first pawl including an arm projecting away from the locking finger of the first pawl; and
the first portion of the body including a stop aligned with and spaced from the first pawl at the location of the locking finger of the first pawl.

8. The messenger wire hanger of claim 7, wherein the stop has an outer end that projects toward the first pawl.

9. The messenger wire hanger of claim 8, wherein the first portion of the body includes a thumb tab disposed above the arm of the first pawl.

10. The messenger wire hanger of claim 7, wherein the body includes an integral second pawl disposed between the middle portion of the body and the hook portion of the body; the second pawl engaging the second portion of the lashing strap.

11. The messenger wire hanger of claim 10, wherein the body has a first side and a second side with a width defined between the first and second sides of the body; the second pawl extending from the first side of the body to the second side of the body.

12. The messenger wire hanger of claim 7, wherein the middle and hook portions of the body define a cradle above the second opening; the second portion of the lashing strap being wrapped around a dowel disposed in the cradle.

13. The messenger wire hanger of claim 12, wherein an additional portion of the second portion of the lashing strap is disposed in the second opening of the body.

14. The messenger wire hanger of claim 10, wherein the first portion of the body defines an additional opening for the lashing strap spaced from the first opening.

15. A messenger wire hanger comprising:
a body having first, middle, and hook portions; the hook portion being in the shape of a hook adapted to hook over a messenger wire;
the body defining a first opening between the first portion and the middle portion;
the body defining second and third openings between the middle portion and the hook portion;
a lashing strap having a first portion and a second portion; the first portion of the lashing strap being disposed in the first opening of the body; the second portion of the lashing strap being disposed in the second and third openings of the body; and
a pawl disposed between the middle and hook portions and extending from the body between the second and third openings; the second portion of the lashing strap being disposed around the pawl.

16. The messenger wire hanger of claim 15, wherein the body has a first side and a second side with a width defined between the first and second sides of the body; the first, middle, and hook portions of the body having the same width.

17. The messenger wire hanger of claim 15, wherein the body includes an additional pawl that is integral to the body; the additional pawl having a locking finger engaged with the first portion of the lashing strap.

18. The messenger wire hanger of claim 17, wherein the additional pawl includes a leg that connects the additional pawl to the first portion of the body; the leg having an area of reduced thickness that allows the additional pawl to flex with respect to the body.

19. The messenger wire hanger of claim 18, wherein the body has a first side and a second side with a width defined between the first and second sides of the body; the additional pawl extending from the first side of the body to the second side of the body to have a width that is the same as the width of the body.

20. The messenger wire hanger of claim 17, wherein the additional pawl includes an arm projecting away from the locking finger of the additional pawl.

21. A messenger wire hanger comprising:
a body having first, middle, and hook portions; the hook portion being in the shape of a hook adapted to hook over a messenger wire;
the body defining a first opening between the first portion and the middle portion;
the body defining second and third openings between the middle portion and the hook portion;
a lashing strap having a first portion and a second portion; the first portion of the lashing strap being disposed in the first opening of the body; the second portion of the lashing strap being disposed in the second and third openings of the body;
the body including a first pawl that is integral to the body; the first pawl having a locking finger engaged with the first portion of the lashing strap;
the first pawl includes an arm projecting away from the locking finger of the first pawl; and
the first portion of the body including a stop aligned with and spaced from the first pawl at the location of the locking finger of the first pawl.

22. The messenger wire hanger of claim 21, wherein the stop has an outer end that projects toward the first pawl.

23. The messenger wire hanger of claim 22, wherein the first portion of the body includes a thumb tab disposed above the arm of the first pawl.

24. The messenger wire hanger of claim 21, wherein the first portion of the body defines a recess between raised shoulders; the first portion of the lashing strap having a portion disposed between the raised shoulders.

* * * * *